Patented July 8, 1941

2,248,401

UNITED STATES PATENT OFFICE 2,248,401

BRANCHED-CHAIN ALKYL-PHENYL-PHENOLS

Edgar C. Britton, Gerald H. Coleman, and Ralph P. Perkins, Midland, Mich., assignors to The Dow Chemical Company, Midland, Mich., a corporation of Michigan No Drawing. Application May 8, 1936,
Serial No. 78,640

17 Claims. (Cl. 260—620)

This invention concerns phenylphenols having branched-chain alkyl substituents at least one of which is attached to the hydroxyl substituted benzene ring. The expression "branched-chain" as herein used refers to all alkyl groups which are secondary-, iso-, or tertiary- in configuration, e. g. secondary-propyl, iso-butyl, tertiary-amyl, iso-hexyl, secondary-heptyl, tertiary-octyl, etc. We have prepared members of the above new class of compounds, determined certain of their physical properties, whereby they can readily be identified, and have found them particularly useful as microbicides, antiseptics, preservatives, intermediates, etc.

These compounds are for the most part viscous, high boiling, water-white liquids, although some of them show a tendency to crystallize on prolonged standing. They are substantially insoluble in water, but somewhat soluble in dilute aqueous alkaline solutions and most organic solvents.

These new compounds can be prepared by reacting a phenylphenol with a suitable alkyl halide in the presence of a catalyst such as aluminum chloride, aluminum bromide, iron chloride, zinc chloride, Tonsil, etc. Such halides may be either normal-, secondary-, iso-, or tertiary- in configuration provided that if normal in character they contain three or more carbon atoms, for example, normal-butyl chloride, iso-butyl bromide, iso-propyl chloride, tertiary-amyl chloride, secondary-butyl iodide, iso-hexyl chloride, tertiary-octyl bromide, etc. While the phenylphenol and the alkyl halide can be reacted together in any desired proportions, maximum yields of the monoalkyl substituted phenylphenols are generally obtained when the phenylphenol is present in the reaction mixture in considerable excess of the amount theoretically required. The yield of poly-alkyl substituted derivatives ordinarily increases as the molecular proportion of alkyl halide to phenylphenol is raised. However, regardless of the proportions used a mixture of the mono- and poly-substitution products is generally formed.

In preparing derivatives of ortho- and meta-phenylphenols the reaction is conveniently carried out in the liquid phase in the presence of the catalyst, slowly adding the alkyl halide below the surface of the liquid reaction mixture with stirring, and thereafter heating and stirring the reaction mixture until the condensation is complete, i. e. until hydrogen halide is no longer evolved. The reaction temperature is dependent upon the particular reactants involved, but is usually between about 75° and about 175° C., although higher temperatures may be employed. If desired, the reactants may be dispersed in an inert solvent, e. g. carbon tetrachloride, ethylene chloride, etc., in which case the use of somewhat lower reaction temperatures is practicable. The reaction is usually substantially complete in from 1 to 10 hours, depending upon the particular reactants and the proportions thereof employed. After the reaction is completed, the crude alkylated mixture is washed with dilute aqueous hydrochloric acid to decompose and remove residual catalyst, and the desired products separated, e. g. by fractional distillation in vacuo, etc.

In preparing alkyl derivatives of para-phenylphenol, a similar process may be followed except that the use of an inert solvent is preferable, since at the high temperatures required to liquefy the phenol by heat, optimum yields are usually not obtained in reactions involving the lower boiling alkyl halides.

Among other methods by which the compounds may be prepared are (1) by hydrolysis of suitable alkylated halo-diphenyl derivatives, e. g. 2-tertiary-butyl-4-bromo-diphenyl, 2-bromo-5-iso-propyl-diphenyl, etc.; (2) by condensation of the phenylphenols with olefinic materials containing at least three carbon atoms, e. g. propylene, iso-butylene, etc.; (3) by diazotization of the alkylated amino-diphenyls, e. g. 2-iso-propyl-4-amino-diphenyl, 2-amino-5-tertiary-amyl-diphenyl, etc., and decomposition of the resulting diazonium complex with aqueous alkali; (4) by the esterification of the phenylphenols with branched-chain aliphatic organic acids, rearrangement of such esters with anhydrous aluminum chloride, and reduction of the resulting ketonic bodies, and (5) by rearrangement of the phenylphenol branched-chain alkyl ethers with a catalyst such as aluminum chloride.

The following examples describe in detail the preparation of certain individual members of our new class of compounds, but are not to be construed as limiting the invention.

EXAMPLE 1.—*Mono- and di-secondary propyl-6-phenylphenol*

A mixture of 1700 grams (10.0 moles) of ortho-phenylphenol and 133 grams (1.0 mole) of finely divided anhydrous aluminum chloride (AlCl₃) was heated to a temperature of 140° C. and 314 grams (4.0 moles) of 2-chloropropane was slowly introduced below the surface of the agitated reaction mixture at a substantially uniform rate over a period of 5 hours. Thereafter the mixture was maintained at 140° C. and stirred for 1 hour, then the viscous reaction mixture was washed with dilute aqueous hydrochloric acid, and fractionally distilled under vacuum to recover 1259 grams (7.41 moles) of unreacted ortho-phenylphenol, 523 grams (2.51 moles) of a mono-secondary-propyl-6-phenylphenol product, and 57 grams (0.22 mole) of 2.4-di-secondary-propyl-6-phenylphenol.

The mono-alkyl product was carefully refractionated to obtain 4-secondary-propyl-6-phenylphenol as a major constituent. This compound is a colorless, viscous liquid having a boiling point of approximately 160° C. at 7 millimeters pressure, and the specific gravity 1.050 at 20°/4° C. 2-secondary-propyl-6-phenylphenol was present only as a very small percentage of the mono-alkylated fraction and was not isolated in a pure form.

2.4-di-secondary-propyl-6-phenylphenol is a colorless, viscous liquid, having a boiling point of 188–190° C. at 8 millimeters pressure, and specific gravity 1.015 at 20°/4° C.

EXAMPLE 2.—*Mono- and di-secondary-butyl-6-phenylphenol*

A mixture of 1700 grams (10.0 moles) of ortho-phenylphenol and 133 grams (1 mole) of finely divided anhydrous aluminum chloride (AlCl₃) was heated with stirring to a temperature of 140° C. and 370 grams (4.0 moles) of 2-chloro-butane was slowly introduced below the surface of the agitated reaction batch over a period of 5 hours, the temperature gradually increasing from 140° to 165° C. Heating and stirring were continued for 1 hour, after which the viscous reaction mixture was washed successively with dilute aqueous hydrochloric acid and water, and fractionally distilled under reduced pressure. 1205 grams (7.09 moles) of unreacted ortho-phenylphenol, 640 grams (2.83 moles) of 4-secondary-butyl-6-phenylphenol, and 149 grams (0.53 mole) of 2.4-di-secondary-butyl-6-phenylphenol were separated out of the crude reaction mixture.

4-secondary-butyl-6-phenylphenol is a colorless, viscous liquid having a boiling point of 163° C. at 6 millimeters pressure and specific gravity 1.041 at 20°/4° C.

2.4-di-secondary-butyl-6-phenylphenol is a colorless, viscous liquid, having a boiling point of 191° to 194° C. at 6 millimeters pressure, and specific gravity 1.003 at 20°/4° C.

EXAMPLE 3.—*Mono- and di-tertiary-butyl-6-phenylphenol*

A mixture of 1660 grams (9.76 moles) of ortho-phenylphenol and 130 grams (0.976 mole) of finely divided anhydrous aluminum chloride (AlCl₃) was heated to a temperature of 125° C. and 370 grams (4.0 moles) of tertiary butyl chloride was slowly introduced below the surface of the agitated reaction mixture at a substantially uniform rate over a period of 10 hours. Agitation and heating were continued for 1 hour, after which the viscous reaction mixture was washed with dilute aqueous hydrochloric acid and fractionally distilled under vacuum to recover 1060 grams (6.24 moles) of unreacted ortho-phenylphenol, 635 grams (2.81 moles) of a mono-tertiary-butyl-6-phenylphenol product, and 128 grams (0.46 mole) of crude 2.4-di-tertiary-butyl-6-phenylphenol.

The mono-alkyl product was found to be principally 4-tertiary-butyl-6-phenylphenol. This compound is a colorless, viscous liquid having a boiling point of approximately 130-3° C. at 2 millimeters pressure, and specific gravity 1.045 at 20°/4° C.

2.4-di-tertiary-butyl-6-phenylphenol is a colorless, viscous liquid having a boiling point of 192-4° C. at 5 millimeters pressure, and specific gravity 0.975 at 50°/4° C.

EXAMPLE 4.—*Mono- and di-(alpha-beta-dimethyl-propyl)-6-phenylphenol*

A mixture of 1700 grams (10 moles) of ortho-phenylphenol and 66.5 grams (0.5 mole) of finely divided anhydrous aluminum chloride (AlCl₃) was heated with stirring to temperatures ranging from 135° to 150° C. for a period of 8 hours, during which time 320 grams (3 moles) of iso-amyl chloride, was slowly introduced below the surface of the agitated reaction batch. Stirring was continued for one-half hour, during which time the temperature was allowed to rise to 160° C., after which the viscous reaction mixture was washed successively with dilute aqueous hydrochloric acid and water and fractionally distilled under reduced pressure. 1229 grams (7.23 moles) of unreacted ortho-phenylphenol, 571 grams (2.38 moles) of mono-amyl-6-phenylphenol, and 68 grams (0.22 mole) of 2.4-diamyl-6-phenylphenol were separated out of the crude reaction mixture.

The mono-amyl fraction was refractionated and found to have, for the most part, the probable formula: 4-(alpha-beta-dimethyl-propyl)-6-phenylphenol, which compound is a colorless, viscous liquid having a boiling point of approximately 176-8° C. at 7 millimeters pressure and specific gravity 1.035 at 20°/4° C.

2.4-di-(alpha-beta-dimethyl-propyl)-6-phenylphenol is a colorless, viscous liquid having the boiling point 207–9° C. at 7 millimeters pressure, and specific gravity 0.992 at 20°/4° C.

EXAMPLE 5.—*Mono- and di-tertiary-amyl-6-phenylphenol*

In a similar manner, 585 grams (3.44 moles) of ortho-phenylphenol, 26.5 grams (0.2 mole) of aluminum chloride, and 106.5 grams (1 mole) of tertiary-amyl chloride were reacted together at 145° C. over a period of 3 hours. After removal of catalyst from the reacted mixture, fractionation under reduced pressure resulted in the recovery of 416 grams (2.45 moles) of unreacted ortho-phenylphenol, 178 grams (0.74 mole) of a mono-tertiary-amyl-6-phenylphenol product, and 40 grams (0.13 mole) of 2.4-di-tertiary-amyl-6-phenylphenol.

Upon refractionation the mono-amyl product was found to be principally 4-tertiary-amyl-6-phenylphenol, which compound has a boiling point of 153-5° C. at 3 millimeters pressure, and a specific gravity of 1.035 at 20°/4° C.

EXAMPLE 6.—*Mono- and di-tertiary-hexyl-6-phenylphenol*

1700 grams (10 moles) of ortho-phenylphenol, 361.5 grams (3 moles) of tertiary-hexyl chloride, and 66.5 grams (0.5 mole) of aluminum chloride were reacted together at temperatures ranging from 83° to 88° C. for a period of 3 hours. 1244 grams (7.32 moles) of unreacted ortho-phenylphenol, 621 grams (2.45 moles) of a mono-tertiary-hexyl-6-phenylphenol product, and 68 grams (0.2 mole) of crude 2.4-di-tertiary-hexyl-6-phenylphenol were separated by fractional distillation from the reaction mixture.

The mono-alkylated fraction was found on analysis to be a mixture of the 2 and 4-mono-tertiary-hexyl-phenylphenol isomers, but to consist principally of the para compound. 4-(alpha-methyl-alpha-ethyl-propyl)-6-phenylphenol is a thick viscous liquid having a boiling point of 183° C. at 7 millimeters pressure and specific gravity 1.023 at 20°/4° C.

2.4-di-(alpha-methyl-alpha-ethyl-propyl)-6-phenylphenol is a colorless, viscous liquid having the boiling point 225–8° C. at 7 millimeters pressure, and specific gravity 0.981 at 20°/4° C.

EXAMPLE 7.—*Tertiary-butyl and tertiary-octyl-6-phenylphenol*

1700 grams (10 moles) of ortho-phenylphenol, 336 grams (3 moles) of di-iso-butylene (boiling point 101–2° C.) and 66.5 grams (0.5 mole) of aluminum chloride were reacted together over a period of 6 hours and at a temperature of 145° to 150° C. substantially as previously described. 870 grams (5.12 moles) of unreacted ortho-phenylphenol was recovered as a low boiling fraction from the reaction mixture. 903 grams of an alkylated product boiling chiefly between 160° and 170° C. at 6 millimeters pressure, and 251 grams of a material boiling chiefly between 175° and 200° C. at 6 millimeters pressure, were obtained by fractional distillation of the alkylated residue.

The lower boiling alkylated mixture was refractionated and found to be, for the most part, 4-tertiary-butyl-6-phenylphenol.

Refractionation of the higher boiling mixture indicated it to be a mixture of 2.4-di-tertiary-butyl-6-phenylphenol and mono-tertiary-octyl (i. e. alpha-alpha-gamma-gamma-tertramethyl-n-butyl)-6-phenylphenol. This mixture was a viscous, colorless liquid boiling at 192°–200° C. at 6 millimeters pressure and having a specific gravity of 0.974 at 60°/4° C.

EXAMPLE 8.—*Mono- and di-secondary-amyl-6-phenylphenol*

1700 grams (10 moles) of ortho-phenylphenol and 66.5 grams (0.5 mole) of finely divided anhydrous aluminum chloride were mixed together and heated to 130° C. To this rapidly agitated mixture 320 grams (3 moles) of n-amyl chloride was added over a period of 2 hours. The temperature was then increased to 160° C. and agitation was continued for an additional 2 hours, after which the aluminum chloride catalyst was removed by washing with dilute aqueous hydrochloric acid and the crude reaction batch was fractionally distilled to recover 1244 grams (7.32 moles) of unreacted ortho-phenylphenol, 572 grams (2.38 moles) of a mono-amyl-phenylphenol product, and 72 grams (0.23 mole) of a mixture of di-amyl-phenylphenol derivatives.

The mono-amyl product upon refractionation was found to be a compound boiling at 173–5° C. at 6 millimeters pressure and having a specific gravity of 1.027 at 20°/4° C., the probable formula being 4-(alpha-methyl-n-butyl)-6-phenylphenol.

The di-amyl-6-phenylphenol boiled at 210–2° C. at 6 millimeters pressure and had a specific gravity of 0.990 at 20°/4° C.

EXAMPLE 9.—*2-isoamyl-6-phenylphenol*

A mixture of 170 grams (1 mole) of ortho-phenylphenol, and 102 grams (1 mole) of iso-valeric acid was heated with stirring to 135° C. for 2 hours during which time 77 grams (0.5 mole) of phosphorous oxychloride was slowly added to the reaction mixture. Heating and stirring were continued until no more hydrogen chloride gas was evolved after which the reaction mixture was cooled, washed with water, dried, and fractionally distilled to recover a substantially quantitative yield of ortho-phenyl-phenyl-isovalerate.

.086 mole of the above ester was treated with 0.95 mole of anhydrous aluminum chloride at 150–160° C. for 2 hours, which treatment resulted in a rearrangement of the ester to form a mixture comprising 3-phenyl-2-hydroxy and 5-phenyl-4-hydroxy-valerophenone. This mixture was washed successively with dilute aqueous hydrochloric acid and water, dried, and the 3-phenyl-2-hydroxy-valerophenone separated therefrom by selective extraction with petroleum ether. The resulting extract was heated to drive off the organic solvent and the ketonic residue reduced with mossy zinc and 20% aqueous hydrochloric acid solution to form a crude mono-isoamyl-phenylphenol product. 2-isoamyl-6-phenylphenol was separated therefrom by fractional distillation as a colorless viscous liquid having a boiling point of 165–170° C. at 4–5 millimeters pressure and specific gravity 1.0500 at 20°/4° C.

EXAMPLE 10.—*4-isopropyl-5-phenylphenol*

In a manner similar to that described in Example 1, meta-phenylphenol was reacted with iso-propyl chloride to obtain a mono-isopropyl-meta-phenylphenol. This compound is a thick viscous liquid boiling at 155–8° C. at 2.5 millimeters pressure, having the specific gravity 1.036 at 65°/4° C., the probable formula being 4-isopropyl-5-phenylphenol.

EXAMPLE 11.—*2-isopropyl-4-phenylphenol*

Para-phenylphenol and iso-propyl chloride were reacted together in the presence of aluminum chloride as previously described to obtain as a product of the reaction 2-isopropyl-4-phenylphenol, which is a colorless, viscous liquid boiling at approximately 180° C. at 6 millimeters pressure and having a specific gravity of 1.03 at 20°/4° C.

While the above examples all employ a single phenylphenol compound as a reactant, mixtures of the isomeric phenylphenols may be reacted with a suitable alkylating agent to form mixtures of compounds falling within the scope of our invention. Phenylphenols substituted in either phenyl group by various inert hydrocarbon residues, e. g. alkyl, aryl, cycloalkyl, alkyloxy, aryloxy, etc., may also be utilized for the preparation of valuable new compounds by the methods described. For instance, 4'-ethyl-6-phenylphenol, 2-methyl-6-phenylphenol, 2'-isopropyl-3-phenylphenol, cyclohexyl-phenylphenol, 4'-methoxy-4-phenylphenol, 2-phenoxy-4-phenylphenol, 4'-methyl-4-methoxy-6-phenylphenol, etc., may be substituted in the above reactions. Similarly mixtures of various alkyl halides, of olefines, or of alkyl halides and olefines, have been found suitable for use in the preparation of our new new materials.

Branched-chain alkyl phenylphenols in which the alkyl residues are substituted in the meta position with respect to the hydroxyl, may readily be prepared (1) by the hydrolysis of any 1-halo-3-branched-chain-alkyl diphenyl, (2) or by the diazotization of a 1-amino-3-alkyl diphenyl and decomposition of the resulting diazonium derivative with aqueous alkali. Polyalkyl derivatives of the present class containing three or more branched-chain alkyl groups may be prepared by the exhaustive alkylation of meta-phenylphenol or by employing as a reactant in the alkylation process a phenylphenol product wherein one or more alkyl groups are already attached to the substituting phenyl group or are substituted in the hydroxylated benzene ring in the meta-position with respect to the hydroxyl.

The mixed reaction products resulting from the described condensations may advantageously be utilized as antiseptics, etc., without separating therefrom the individual alkylated-phenylphenol constituents. Such mixtures are viscous, high boiling liquids, soluble in dilute aqueous and alcoholic alkaline solutions and most organic solvents.

Other modes of applying the principle of our invention may be employed instead of those explained, provided the materials or steps stated by any of the following claims or the equivalent of such stated materials or steps be employed.

We therefore particularly point out and distinctly claim as our invention:

1. An alkyl-phenylphenol containing as a substituent in the hydroxylated benzene ring at least one branched-chain alkyl group.

2. A branched-chain alkyl-phenylphenol wherein the substituting hydrocarbon groups are attached to the hydroxylated benzene nucleus in the 2, 4, and 6 positions.

3. A mono-branched-chain alkyl-phenylphenol wherein the substituting alkyl group is attached to the hydroxylated benzene nucleus in the 4 position with respect to the hydroxyl group.

4. A di-branched-chain alkyl-phenylphenol in which the substituting alkyl groups are in the meta-position one to the other and attached to the hydroxyl-substituted benzene ring.

5. An alkylated phenylphenol, containing at least one branched-chain alkyl substituent, wherein each such alkyl substituent is attached to the hydroxylated benzene nucleus in one of the positions designated as 2, 4, and 6 with respect to the hydroxyl group.

6. An alkyl-ortho-phenylphenol having at least one branched-chain alkyl group substituted in the hydroxylated benzene nucleus.

7. A di-branched-chain alkyl-ortho-phenylphenol wherein the alkyl substituents are attached to the hydroxylated benzene nucleus in the ortho and para positions with respect to the hydroxyl group.

8. An ortho-phenylphenol derivative having two branched-chain alkyl groups substituted in the hydroxylated benzene nucleus.

9. A phenol containing as substituents in the hydroxylated benzene nucleus at least one branched-chain alkyl group and a phenyl group substituted by at least one inert hydrocarbon residue.

10. A branched-chain alkyl-phenylphenol wherein any substituting alkyl group contains from 3 to 8 carbon atoms, and at least one branched-chain alkyl substituent is attached to the hydroxylated benzene ring.

11. An alkyl-phenylphenol containing at least one isopropyl group in the hydroxylated benzene nucleus.

12. An alkyl-ortho-phenylphenol containing at least one branched-chain butyl group in the hydroxylated benzene nucleus.

13. 4-tertiarybutyl-6-phenylphenol.

14. 4-isopropyl-6-phenylphenol.

15. As a new compound 4,6-ditertiarybutyl-2-phenylphenol.

16. The method of preparing an alkyl phenylphenol wherein at least one branched-chain substituent is attached to the hydroxyl-substituted benzene ring which comprises reacting a phenylphenol with a compound containing at least three carbon atoms in the molecule and selected from the class consisting of alkyl halides and olefins, in the presence of a Friedel-Crafts catalyst.

17. The method of preparing an alkyl ortho-phenylphenol wherein at least one branched-chain alkyl substituent is attached to the hydroxyl-substituted benzene ring, which comprises reacting ortho-phenylphenol with a compound having at least three carbon atoms in the molecule and selected from the class consisting of the alkyl halides and olefins, in the presence of aluminum chloride.

EDGAR C. BRITTON.
GERALD H. COLEMAN.
RALPH P. PERKINS.